Patented Oct. 4, 1932

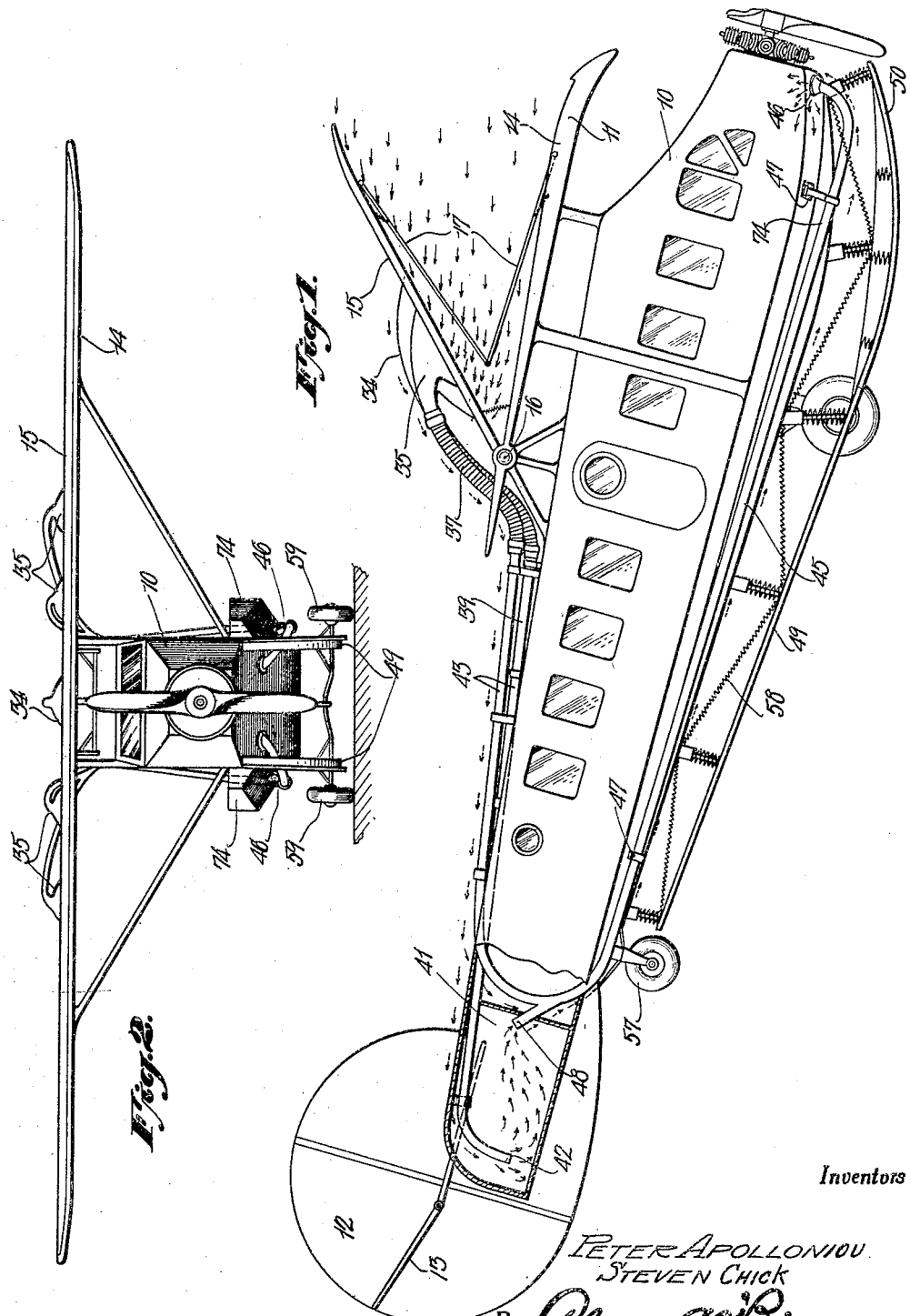

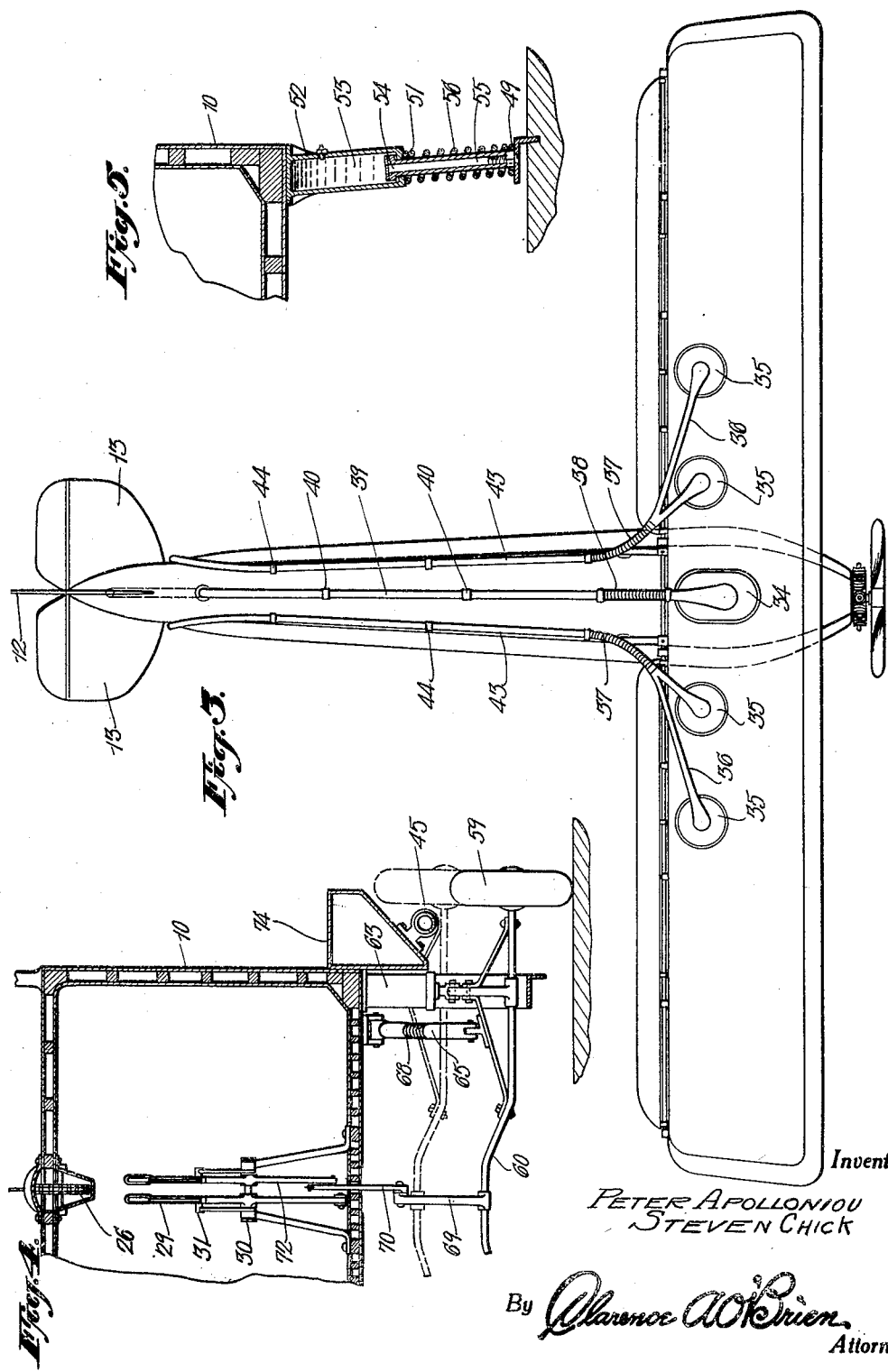

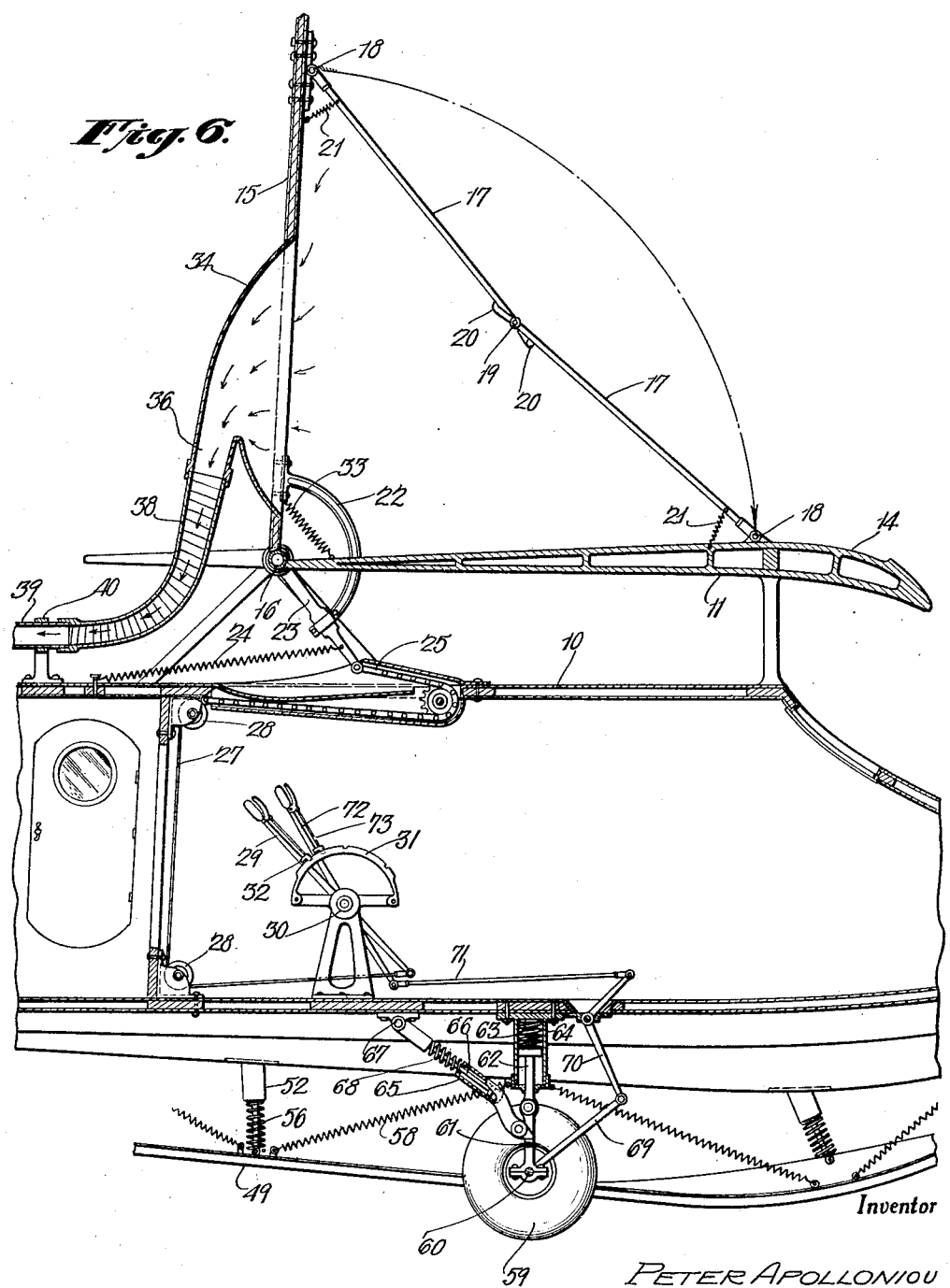

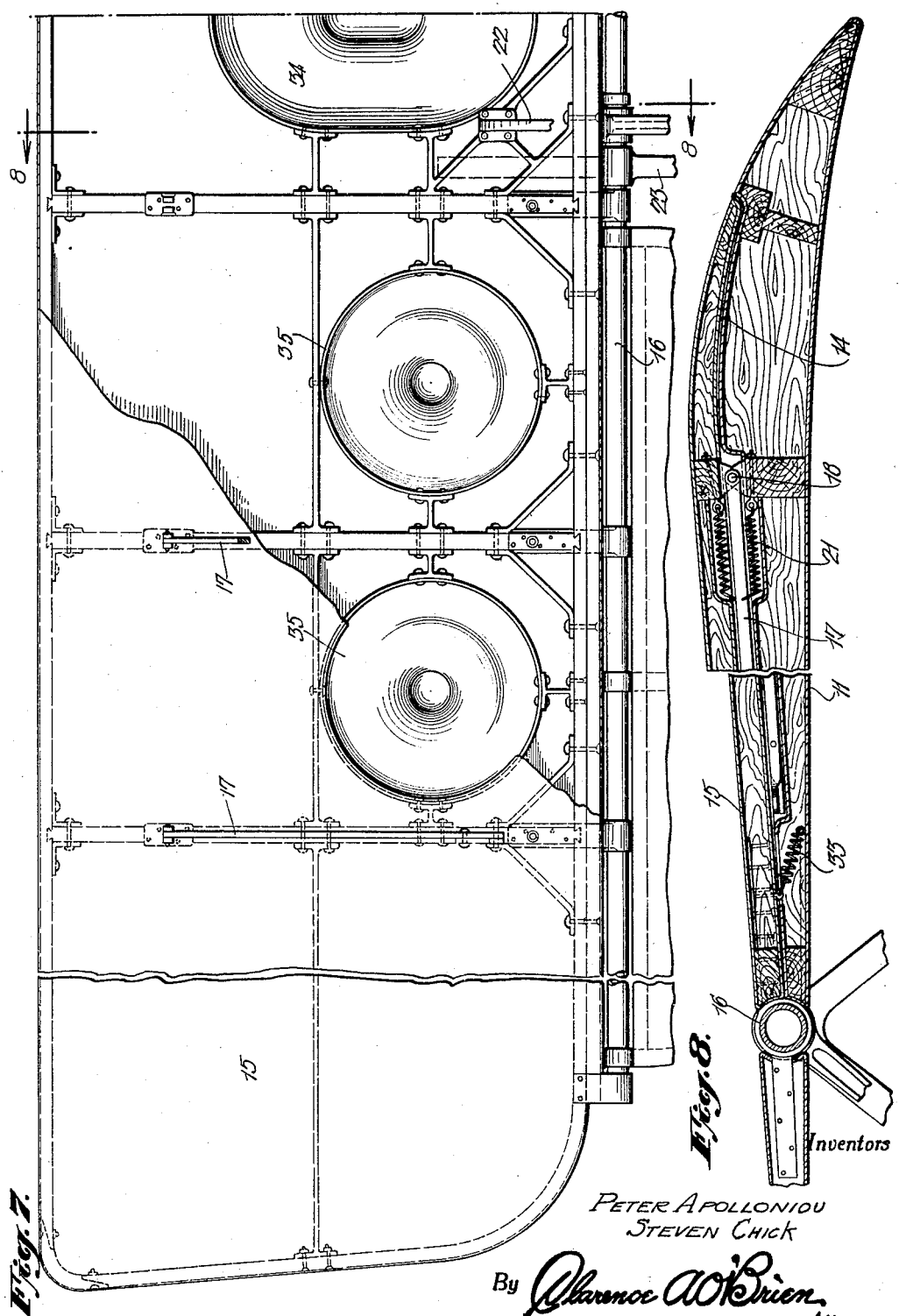

1,881,159

UNITED STATES PATENT OFFICE

PETER APOLLONIOU AND STEVEN L. CHICK, OF NEW YORK, N. Y.

SAFETY AIRCRAFT

Application filed December 22, 1931. Serial No. 582,635.

This invention relates to improvements in aircrafts.

The primary object of the invention resides in a safety aircraft which may be brought to a safe landing on either land or water in the event that the craft should develop engine or faulty control trouble while in flight.

Another object of the invention is to stabilize an aircraft in flight to prevent the same from going into a tail spin or nose dive due to unbalanced conditions of the craft.

A further object of the invention is the provision of an air craft in which air streams are directed against the bottom of the tail end of the fuselage and upward against the under side of the same at the forward or nose end thereof to straighten or right the plane to a horizontal position when the occasion demands, the air stream being created by reason of the forward speed of the craft.

A still further object of the invention is to provide the above safety features which are simple of construction, positive of operation, and which may be embodied in various types of air crafts now in use without requiring radical changes in the construction thereof.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a side elevational view of an air craft in flight constructed in accordance with our invention, and with parts broken away in section.

Figure 2 is a front elevational view with the air collector wing section in closed or inoperative position.

Figure 3 is a top plan view of the same.

Figure 4 is a fragmentary vertical transverse sectional view.

Figure 5 is a detail vertical transverse sectional view through one of the landing gear shock absorbers.

Figure 6 is an enlarged detail vertical longitudinal sectional view.

Figure 7 is an enlarged fragmentary top plan view of the wing structure.

Figure 8 is a vertical transverse sectional view on the line 8—8 of Figure 7.

Referring to the drawings by reference characters, the numeral 10 designates the fuselage of an air craft of the monoplane type which fixedly supports a wing 11 transversely of the top thereof, while a rudder 12 is provided at the tail end of the fuselage together with the usual elevators 13.

The top surface of the fixed wing 11 is provided with a recess 14 which extends longitudinally thereof and pivotally mounted at the rear end of the recess to the wing 11 is an air collector wing section 15, the pivot or hinge connection being indicated at 16. Brace links 17—17 have one of their ends respectively pivoted to the outer ends of the wing section 11 and pivoted wing 15 as at 18, while the opposite ends of the said links are pivotally connected together as at 19. The extreme free ends of the meeting ends of the links are bent to provide stops 20, the stop on one link engaging the opposite link to limit the pivotal movement of the link when the pivoted wing section 15 is swung to an open or raised position, the said stop acting to hold the links off center when the section 15 is in fully open position in order to permit the joint to break when the actuating mechanism is operated for moving the wing section 15 to closed position. The springs 21 have one end connected to the links 17 adjacent their pivotal connections 18, while the opposite ends of the springs are respectively connected to the wing sections 11 and 15 as best seen in Figures 6 and 8 of the drawings.

Fixed to the under side of the pivoted wing section 15 and extending through a slot provided in the wing section 11 is a segmental arm 22 disposed adjacent the pivotal connection 16 and the free end of the arm 22 is fixedly connected to a lever 23 which in turn has one end fixedly connected to the axis of the pivoted wing sections 15. The spring 24 has one end connected to the outer end of the lever 23 and its opposite end fixed to the top of the fuselage and which has a tendency to exert a pull upon the lever 23 to assist in moving the pivoted wing 15 to a closed position upon actuating the operating mechanism presently to be explained. The extreme free end of the lever 23 is connected to one end of a sprocket chain 25, which chain passes over a sprocket wheel 26 journaled in bearings mounted in the top of the fuselage, while the opposite end of the sprocket chain is fixedly connected to a flexible cable 27 which passes over vertically alined pulleys 28 mounted respectively adjacent the top and bottom of the fuselage 10. The other end of the cable 27 is carried forward and is connected to the lower end of an actuating lever 29 pivoted upon a support 30 fixed to the bottom of the fuselage 10. The support 30 also includes a notched segment 31 over which the locking catch 32 of the lever 29 passes, the said catch is adapted to be received in the notches in the segment 31 to hold the lever in various positions of adjustment.

From the description set forth above, it will be seen that by actuating the lever 29 in a rearward direction a pull will be exerted upon the cable 27 which in turn pulls upon the sprocket chain 25 causing the lever 23 to swing the pivoted wing section 15 from a closed position such as shown in Figure 8 to the open position shown in Figure 6 of the drawings. By operating the lever 29 forwardly, a slack occurs in the cable 27 and chain 25 permitting the spring 24 and spring 33 connected to the pivoted wing 15 and the fixed wing 11 to swing the pivoted section to closed position.

Fixedly mounted in the pivoted wing section 15 centrally thereof is a funnel or horn shaped air collector 34, while also mounted in the said wing section on opposite sides of the collector 34 are sets of smaller air collectors 35 which are of a shape similar to the collector 34. The enlarged mouth portions of the air collectors open through the front of the pivoted wing section 15 while the outlet or discharge ends 36 extend rearwardly of the said wing section, the discharge ends of the sets 35 of each set of air collectors merging into a single discharge outlet to which sections of flexible hose 37 are connected, while a similar hose is connected to the discharge end of the air collector 34 and is designated by the numeral 38.

Connected to the flexible hose section 38 is a pipe or tube 39 extending rearwardly over the top of the fuselage and fixed thereto by brackets 40, the said pipe or tube entering the compartment 41 at the rear of the fuselage 10, the rear end of the pipe terminating adjacent the bottom of the compartment 41 and extending in a downwardly curved direction as at 42.

Connected to the flexible hose sections 37 are one end of air pipes or tubes 43 which extend rearwardly of the fuselage and fixedly mounted thereon by brackets 44, the said pipes being curved or looped adjacent the tail end of the fuselage and are brought forward beneath the under side of the fuselage to provide pipe sections 45, the front ends of the said pipes terminating in upturned discharge nozzles 46 spaced adjacent the forward or nose end of the fuselage, and beneath the under side thereof. The pipe sections 45 are also fixed to the under side of the fuselage by brackets 47. Extending from the looped ends of the air pipes 43 and entering the compartments 41 are inwardly and upwardly extending branch pipes 48 into which air from the compartment 41 passes after being discharged thereinto by the air pipes 39.

From the description thus far, it will be seen that when an air craft equipped with this invention is in flight and is disabled, or becomes unstable, the pilot or operator within the fuselage may actuate the lever 29 to swing the pivoted wing section 15 to a raised or open position so that the wing section 15 acts as an air baffle which presents the enlarged open ends of the air collectors 34 to the force of the air, which air passes into the air collector 34 and sets of air collectors 35. The air entering the collector 34 passes through the pipe 39 and is discharged through the downwardly curved end 42 of the said pipe against the bottom of the compartment 41, thus causing the tail end of the air craft to be depressed. The air entering the sets of collectors 35 passes through the pipes 43 and is carried through the pipe sections 45 and discharged through the nozzles 46 against the under side of the fuselage at the front or nose end thereof, thus causing an upward lift or pressure against the front end of the craft. By applying this reverse pressure to opposite ends of the fuselage, it will be seen that the air craft may be moved to a horizontal plane which will prevent the same from going into a nose dive or tail spin due to unstability. The flow of air through the looped or curved ends of the pipes 43 tend to induce or suck the air from the compartment 41, so as to enter the air stream through the pipe section 45 and increase the volume of air discharged through the nozzles 46.

The pivoted wing 15 in addition to presenting the open sides of the air collectors to the force of the air may also be actuated to an open position or partially open position such as shown in Figure 1 of the drawings for bringing the nose end of the plane upwardly as the same acts as a baffle against which the air strikes. The angular position of the pivoted wing member 15 may be varied and serves to coact with the air pressure at the tail and nose ends of the fuselage for stabilizing the craft while in flight.

Suspended beneath the fuselage 10 and extending lengthwise thereof are longitudinal skids or runners 49, the front ends being curved upwardly as at 50. These runners are yieldingly mounted by providing fluid shock absorbers 51, each of which comprises a cylinder 52 fixedly secured to the under side of the fuselage and which is filled with a fluid 53. Slidable in the cylinder 52 is the head 54 of a piston, the piston rod 55 being fixedly connected to the skid 49. A spring 56 encircles each piston rod and is interposed between the lower end of the cylinder and the skid 49. The springs 56 of the respective shock absorbers tend to hold the skids in an extended position and when landing, the piston is slidable within the cylinder and the shock is cushioned by reason of the fluid contained therein.

Mounted adjacent the tail end of the fuselage and extending therebeneath beyond the skid 49 is a tail wheel 57 and this wheel and the skid 49 constitutes the landing gear. Diagonally disposed springs 58 have one end fixed to the upper ends of the cylinders 52 and their opposite ends connected to the skids as best seen in Figure 1 of the drawings.

In landing, the craft is gradually brought down to the surface of the ground and slides thereover by reason of the skids 49, the shocks being absorbed by the fluid shock absorbers and springs 58. For permitting the air craft to take off from the ground, we provide a set of wheels 59 journaled on a transversely disposed axle 60 which in turn is supported by links 61, the upper ends of the links being pivotally connected to the lower ends of pistons 62 slidable in cylinders 63 bolted to the under side of the fuselage 10 adjacent opposite sides thereof. A spring 64 is interposed between the head of the head of each piston 62 which tends to move the pistons in an outwardly or depressed position. Pivotally connected to the links 61 is one end of a cylinder 65 in which a piston 66 is slidable. The outer end of the piston is pivotally connected as at 67 to the under side of the fuselage and interposed between the free end of the cylinder and a shoulder on the piston rod is a spring 68, which spring tends to exert a forward push upon the link 61 to which it is connected. It will of course be understood that two of these spring actuated plungers are provided, one for operative connection with each of the links 61, and the purpose of the same is to normally urge the wheel carrier in a forward direction to position the wheels 59 above the tread surface of the skids 49. The actuating means for moving the wheels to operative or inoperative position consists of an arm 69 fixedly connected to the axle 60 and which is pivotally connected to one arm of a bell crank lever 70 which is pivotally mounted in the bottom of the fuselage. The other arm of the bell crank lever has one end of a link 71 pivotally connected thereto, while the opposite end of the said link is pivoted to the lower end of an actuating lever 72, the same being pivotally supported by the support 30 and being provided with a spring pressed catch 73 for engagement with the nut segment 31. By moving the lever 72 in a forward direction, a pull will be exerted upon the link 71 which swings the bell crank 70 to exert a forward pull upon the arm 69 which of course pulls the axle 60 and wheels 59 forwardly above the plane of the tread portions of the skids 49. The spring 68 also acts in moving the wheels to inoperative position. Thus it will be seen that after the aircraft has taken off from the ground, the wheels may be swung to an inoperative position above the plane of the skid and may remain in such position until such time as it is necessary to lower them. Although the wheels do not necessarily have to be relied upon in the landing of the air craft on the ground, nevertheless they may be swung to operative position by the actuation of the lever 72 from a forward to a rearward position, and any shock caused by contact of the wheels with the ground will be absorbed by the shock absorbers consisting of the plungers 62, cylinders 63 and springs 64. The shock absorbers also tend to relieve shocks during the passage of the wheels over uneven ground during a take off.

In order to render the air craft safe for the landing upon the surface of a body of water, we provide bouyant air tanks 74 on opposite sides of the fuselage adjacent the bottom thereof, and which tanks extend fore and aft of the fuselage. It will thus be seen that in addition to permitting a safe landing upon the ground, the craft may also be brought to a landing upon the surface of the water, and remain afloat due to the increased bouyancy embodied thereto by the air tanks 74.

While we have shown and described what we deem to be the most desirable embodiment of our invention, we wish it to be understood that various changes as come within the scope of the appended claims may be resorted to if desired.

Having thus described the invention, what we claim as new and desire to secure by Letters Patent is:—

1. In an aircraft having a fuselage, and a fixed wing, a safety wing pivoted to said fixed wing, control means operable from within said fuselage for raising and lowering said safety wing, air collectors mounted on said safety wing, and air pipes leading from said air collectors to a point adjacent the bottom of said fuselage at the tail or rear end thereof, and to a point beneath the fuselage at the nose or front end thereof.

2. In an air craft having a fuselage and a fixed wing, a safety wing hinged to the rear edge thereof and foldable down over said fixed wing or movable to a substantially vertical position, control means operable from within said fuselage for swinging said safety wing to either a raised or lowered position, air collectors mounted in said safety wing, and opening forward thereof when said safety wing is in a raised position, air pipes fixedly mounted on said fuselage, one end of said pipe terminating adjacent said fixed wing, the other end of one pipe terminating in a downward direction adjacent the bottom of the rear end of said fuselage, the other ends of the other air pipes terminating adjacent the front end of the fuselage and extending upward therebeneath, and flexible hose connections between said air collectors and the respective air pipes.

3. In an air craft having a fuselage, air collecting means carried thereby, operating means operable from within said fuselage for rendering said air collecting means operable and inoperative, and means for conveying collected air from said air collecting means when in operative position and discharging the same down against the rear end of said fuselage and upwardly beneath the front end thereof, whereby the reverse pressure against the opposite ends of said fuselage will tend to stabilize the air craft while in flight.

In testimony whereof we affix our signatures.

PETER APOLLONIOU.
STEVEN L. CHICK.